United States Patent [19]

Miller

[11] Patent Number: 5,207,489
[45] Date of Patent: May 4, 1993

[54] NOISE REDUCTION APPARATUS FOR A TRACK SYSTEM OF AN OFF-HIGHWAY IMPLEMENT

[75] Inventor: Larry E. Miller, Wausau, Wis.

[73] Assignee: Case Corporation, Racine, Wis.

[21] Appl. No.: 853,929

[22] Filed: Mar. 19, 1992

[51] Int. Cl.⁵ .............................................. B62D 55/12
[52] U.S. Cl. ........................................ 305/56; 305/28; 295/7
[58] Field of Search .................. 305/21, 24, 27, 28, 305/56, 57, 60; 295/7, 11

[56] References Cited

U.S. PATENT DOCUMENTS

| | | | |
|---|---|---|---|
| Re. 30,039 | 6/1979 | Clemens et al. | 305/21 |
| 3,603,650 | 9/1971 | Miller | 305/28 X |
| 3,897,980 | 8/1975 | Dester et al. | |
| 3,901,336 | 8/1975 | Bendure | |
| 3,989,314 | 11/1976 | Reinsma et al. | 305/28 |
| 4,081,202 | 3/1978 | Kozuki | |
| 4,083,247 | 4/1978 | Umezaki et al. | |
| 4,116,497 | 9/1978 | Schimpf et al. | |
| 4,124,255 | 11/1978 | Kohriyama | |
| 4,150,857 | 4/1979 | Dester et al. | |
| 4,150,858 | 4/1979 | Fox et al. | |
| 4,203,633 | 5/1980 | Hare | |

FOREIGN PATENT DOCUMENTS 0138068  10/1981  Japan ................................. 305/28

Primary Examiner—Russell D. Stormer
Attorney, Agent, or Firm—Dressler, Goldsmith, Shore, Sutker & Milnamow, Ltd.

[57] ABSTRACT

A noise attenuating assembly for reducing noise levels caused by an endless track assembly during operation of an off-highway implement such as a crawler tractor. The noise attenuating assembly comprises an annular elastomeric ring affixed about an idler wheel on the track assembly. The elastomeric ring is positioned such that pin and bushing assemblies of the track assembly directly and resiliently engage with the periphery of the ring thereby reducing noise as the track assembly rotates about the wheel. A ring retaining assembly which circumferentially extends in recessed relation about the outer periphery of the ring facilitates assemblage of the ring to the idler wheel.

7 Claims, 2 Drawing Sheets

NOISE REDUCTION APPARATUS FOR A TRACK SYSTEM OF AN OFF-HIGHWAY IMPLEMENT

FIELD OF THE INVENTION

The present invention generally relates to track type implements and, more particularly, to an apparatus for reducing noise levels generated by the tracks during operation.

BACKGROUND OF THE INVENTION

Crawler tractors and other types of off-highway implements are typically provided with endless tracks on opposite sides thereof. During operation of the implement, a major source of noise is generated by the metal tracks as they pass over a drive wheel, front idler, and carrier rollers.

A typical track is comprised of a series of metal links. Adjacent ends of the links are pivotally interconnected by a pin and bushing assembly to form an endless chain. The noise generated by the track arises from the bushing and links impacting against the periphery of the wheel, idler, and rollers as the track circulates during moving of the implement. Noise production is transmitted through the implement structure, radiated to the interior and amplified by resonant conditions.

Attempts at reducing the noise level by reducing the mass of the track or by increasing the diameter of the idler wheels for the tracks have been implemented in the past. Tensioning the track as by mounting the drive wheel and idler wheel with their axes resiliently positioned with respect to each other in order to hold the chain or track taut has also been used to reduce the noise level of the track during implement operation. The above efforts notwithstanding, relatively high noise levels continue to be an inherent problem and pose a public nuisance problem during operation of crawler tractors and the like.

Thus, there is a need and a desire for an apparatus capable of reducing the noise level inherent with circulation of an endless track during operation of a crawler tractor and the like.

SUMMARY OF THE INVENTION

In view of the above, and in accordance with the present invention, there is provided noise attenuating means for reducing noise levels caused by an endless track assembly during operation of an off-highway implement such as a crawler tractor. The noise attenuating means of the present invention comprises an annular elastomeric ring affixed about an idler wheel about which the track is entrained. The idler wheel is supported by the track frame. A recoil assembly is mounted between the idler wheel and drive sprocket to act as a tensioning device and cushion against shock loads. The elastomeric ring is positioned such that pin and bushing assemblies of the track directly and resiliently engage with the periphery of the ring thus reducing noise as the track assembly rotates about the wheel.

The idler wheel is preferably configured with a central annular rim sized with a diameter greater than other axially spaced rims provided on the idler wheel. The elastomeric ring has a split configuration defining first and second ends and is circumferentially affixed about the large central rim by a ring retaining assembly. The ring retaining assembly preferably comprises a annular band circumferentially extending in recessed relation about an outer periphery of the elastomeric ring.

In a most preferred form of the invention, the central rim of the idler wheel is provided with an annular channel which defines crown rims on opposite sides thereof. A widthwise portion of the dual crown rims acts as a support for the elastomeric ring. A central portion of the elastomeric ring is received within the channel to prevent lateral shifting of the ring relative to the idler wheel.

The elastomeric ring provides a cushion about the periphery of the idler wheel. The elastomeric cushion absorbs a substantial portion of the energy present in the movement of the chain about the periphery of the idler wheel thereby reducing noise and impact force transmitted to the wheel mount. The ring retainer assembly facilitates assemblage of the elastomeric ring to the idler wheel. The channel in the idler wheel allows the ring retaining assembly to remain recessed from the periphery of the elastomeric cushion and inhibits inadvertent lateral shifting of the ring or cushion during operation of the implement.

Numerous other features and advantages of the present invention will become readily apparent from the following detailed description, the accompanying drawings, and the appended claims.

DETAILED DESCRIPTION OF A PREFERRED EMBODIMENT

Figure 1:
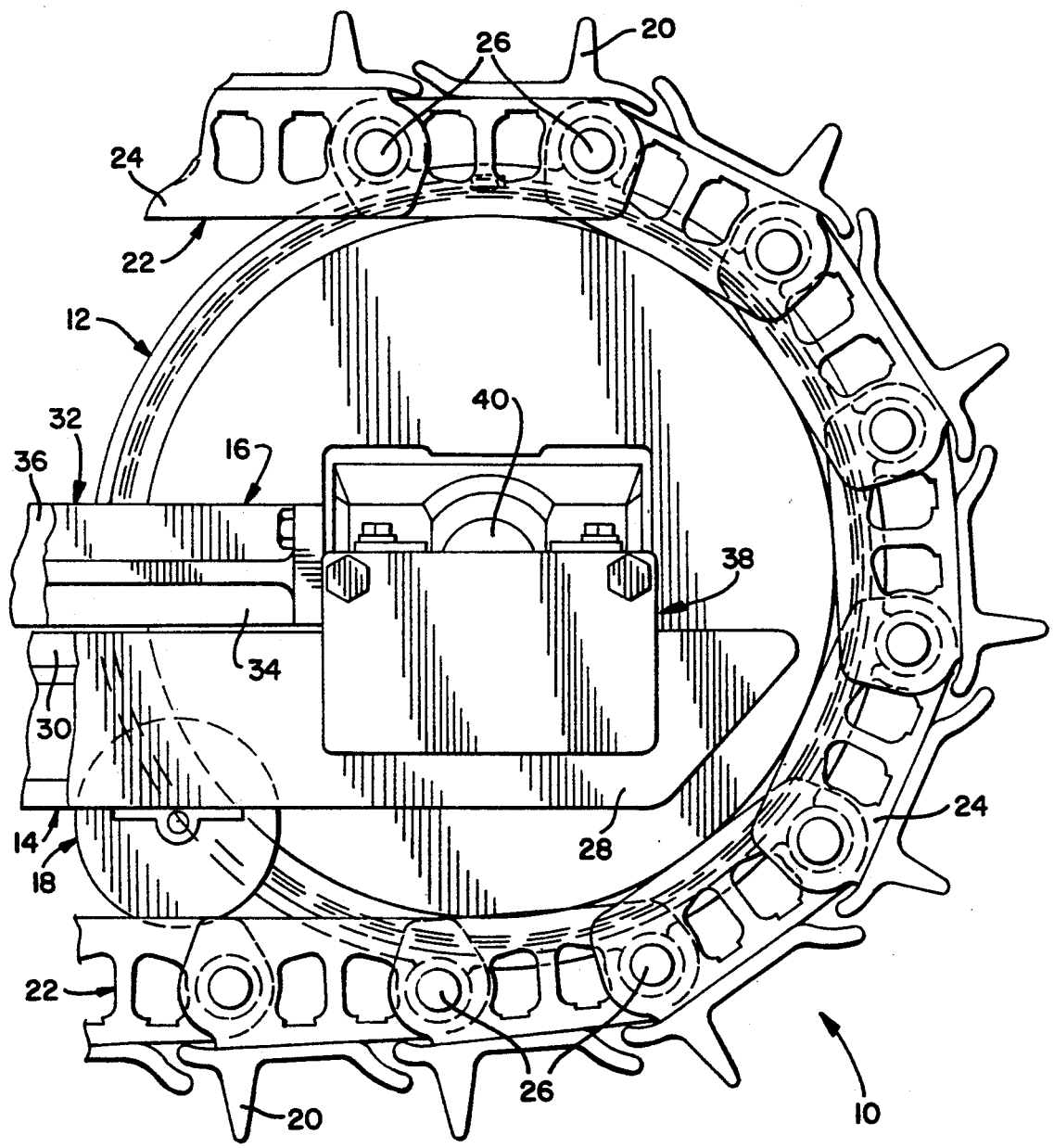
FIG. 1 is a fragmentary side elevational view of a track assembly incorporating principles of the present invention.

While the present invention is susceptible of embodiment in various forms, there is shown in the drawings, and will hereinafter be described, a presently preferred embodiment of the invention with the understanding that the disclosure is to be considered as an exemplification of the invention which is not intended to limit the invention to the specific embodiment illustrated.

Referring now to the drawings, wherein like reference numerals refer to like parts throughout the several views, there is fragmentarily illustrated a portion of a track assembly for a crawler tractor or other form of off-highway implement. As shown, the track assembly includes an endless track 10 trained about an idler wheel 12 mounted to a track frame 14. The track assembly further includes a recoil assembly 16 and a series of rollers 18 secured to the track frame.

Track 10 comprises a plurality of track shoes 20 secured to an articulated chain 22 in a conventional manner. Laterally spaced pairs of links 24 of the chain 22 are pivotally interconnected by pin and bushing assemblies 26. Each pin and bushing assembly is adapted to engage with a notch or root defined between circumferentially adjacent teeth on a drive wheel (not shown) for driving the track in a conventional manner. The above described elements are all well known in the art.

Track frame 14 is mounted to the crawler tractor in a conventional manner. The track frame 14 has a bifurcated end section including a pair of spaced general horizontal beams 28 and 30 which sandwich the idler wheel 12 therebetween.

The recoil assembly 16 is mounted to the frame 14 to maintain the track 10 in tension. Recoil assembly 16 further allows the idler wheel 12 to recoil and relieves tension on the track to a limited degree in the event that a rock or other hard object is entrapped on the inside of the track. In the illustrated embodiment, recoil assembly 16 includes a resiliently biased yoke 32 including a pair of spaced legs 34 and 36. Legs 34, 36 extend generally parallel to the frame 14 and have the idler wheel 12 mounted therebetween. A pair of idler wheel mounts 38 are secured to the distal end of each leg 34, 36. Each idler wheel mount 38 is preferably formed from a unitary block structure and journals an idler wheel spindle 40 about which wheel 12 rotates.

Figure 2:
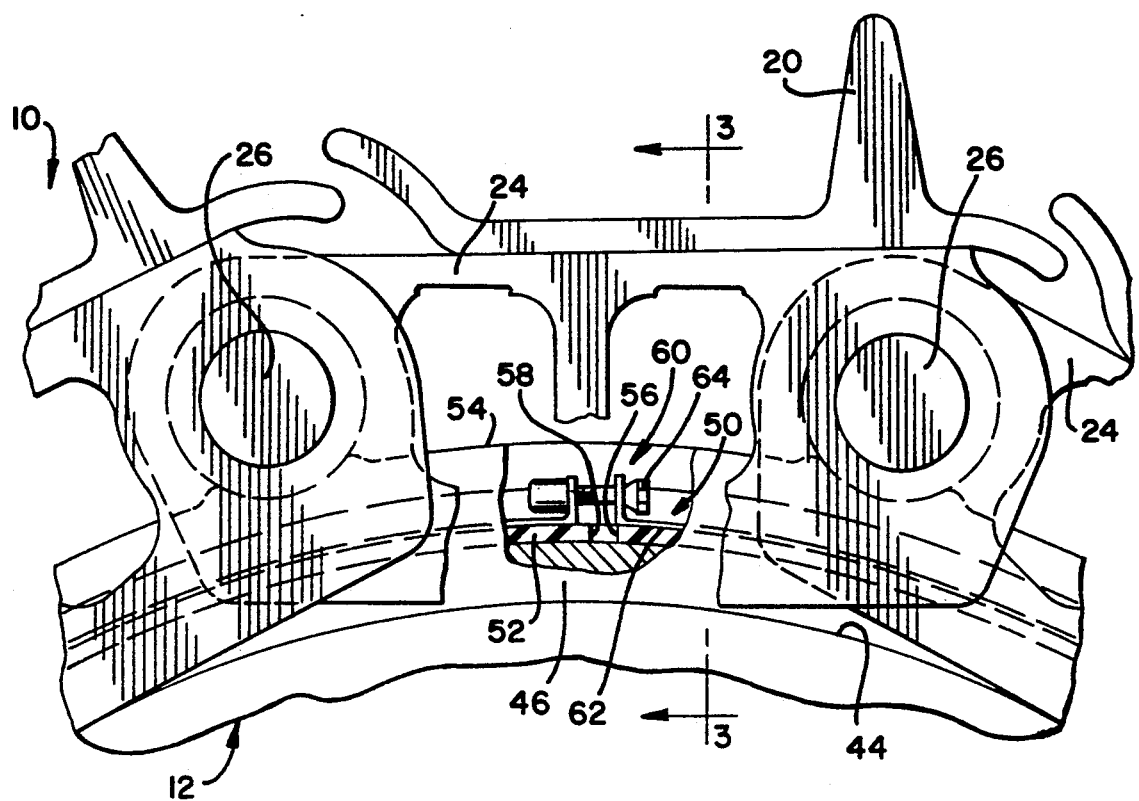
FIG. 2 is an enlarged side elevational view of the track assembly with parts broken away to illustrate certain features of the present invention.
Figure 3:
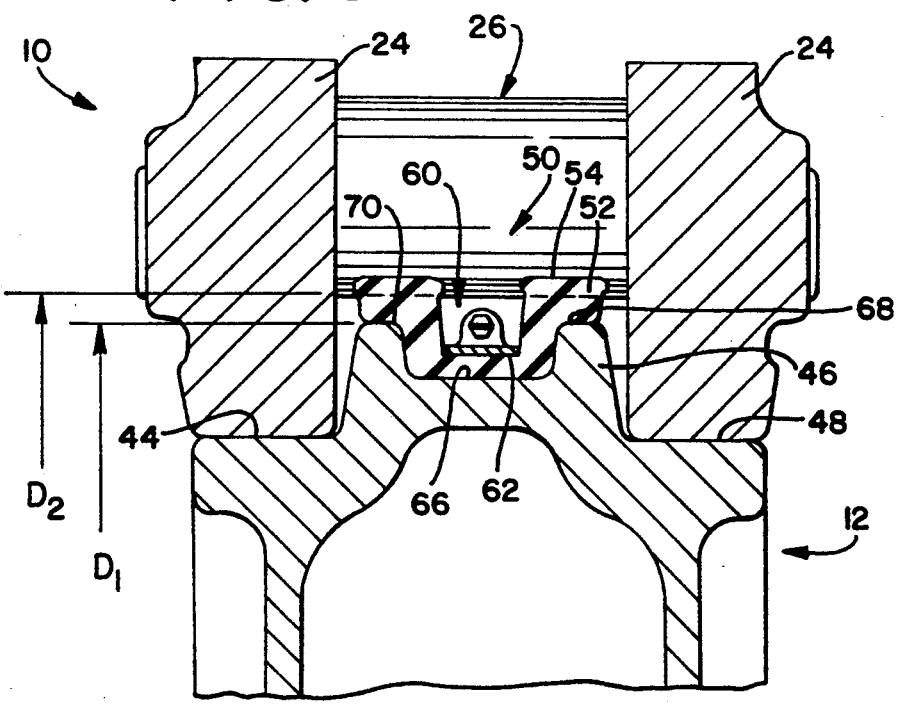
FIG. 3 is a sectional view taken along line 3—3 of FIG. 2.

As shown in FIGS. 2 and 3, the idler wheel 12 is configured with a plurality of axially spaced annular rims 44, 46 and 48. Rims 44 and 48 are arranged on opposite sides of the idler wheel 12 for supporting and guiding the links 24 of chain 22 thereabout. As shown, the annular rims 44 and 48 are substantially equal in diameter and are smaller in diameter than the central rim 46.

According to the present invention, a noise reducing or attenuating assembly 50 is carried by the idler wheel 12. The noise attenuating assembly 50 includes an annular elastomeric ring 52 which circumferentially surrounds the central rim 46 and is adapted to directly and resiliently engage the pin and bushing assemblies 26 thereby reducing contact noise between track 10 and the wheel 12 as the track rotates about the wheel 12.

As shown in FIG. 3, the central annular rim 46 has a predetermined diameter schematically represented by D1. The pin and bushing assembly 26 are disposed such that an underside of each bushing is disposed at a predetermined diameter D2 as the chain 22 rotates about the wheel 12. D2 is greater than D1. Ring 52 is disposed within the space between rim 46 and the underside of the pin and bushing assemblies 26. A cross-sectional configuration of the ring 52 has a thickness which is greater than the difference between the predetermined diameters D1 and D2. Thus, a portion of ring 52 is placed in compression between the pin and bushing assembly 26 and the outer rim 46 as the track 10 moves about the wheel 12 thereby providing a cushioning and noise attenuating effect.

In the preferred form of the invention, ring 52 is fabricated from an extruded generally flat elastomeric material which is cut to a suitable length to define a substantially continuous elastomeric cushion about wheel 12. A suitable urethane compound which is suitable for the environmental conditions and has a durometer hardness sufficient to allow compression thereof by the pin and bushing assembly 26 passing about the wheel 12 is one form of elastomeric material which would suffice to provide the desired cushion and dampening affect of the present invention.

In the invention illustrated in FIG. 2, ring 52 is provided with first and second ends 56 and 58 and a ring retaining assembly 60 for releasably holding the ring 52 in place about the wheel 12. In the illustrated embodiment, the ring retaining assembly 60 includes an annular clamp 62 which fits about and is recessed from the bushing engaging surface 54 of the cushion 52 and suitable means 64 such as a nut and bolt or the like for releasably affixing opposite ends of clamp 62 to each other thereby facilitating assemblage of the ring 52 to the wheel 12.

As shown in FIG. 3, the central rim 46 of idler wheel 12 has an annular channel or groove 66 which opens to the periphery of rim 46 and defines dual crown rims 68 and 70 on opposite lateral sides of channel 66. At least a widthwise portion of each crown rim 68, 70 acts as a support for the elastomeric ring 52. Channel 66 on rim 46 receives and accommodates a portion of the elastomeric cushion 52 circumferentially arranged about the rim 46 such that the cushion 52 has a generally U-shape cross-sectional configuration when assembled to the idler wheel 12. With a central portion of ring 52 receivably accommodated within channel 66, ring 52 is inhibited against lateral shifting on the annular rim 46 during operation of the tractor.

During operation, compression of the elastomeric ring 52 between the pin and bushing assembly 26 and the outer rim 46 of wheel 12 attenuates metallic sounds and vibrations normally resulting from the impact between chain 10 and wheel 12. The ring retaining assembly 60 facilitates assemblage of the ring or cushion 52 to the idler wheel 12. Moreover, recess 66 in the wheel rim 46 allows the retaining assembly 60 to remain recessed from the peripheral surface 54 of the elastomeric cushion 12 and inhibits inadvertent lateral shifting of the ring or cushion 52 during operation of the implement. Providing the cushion 52 between the chain 22 and wheel 12 furthermore reduces impact forces of the idler 12 against the spindle 42.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An idler wheel mounted for rotational movement on a track assembly including an articulated chain comprised of a plurality of links which are pivotally interconnected by a series of pin and bushing means, said idler wheel having first and second annular rims of substantially equal diameters arranged on opposite sides of the idler wheel for engaging and guiding the chain links thereabout and a third central annular rim sized with a diameter greater than the diameter of said first and second rims, and a split elastomeric ring extending circumferentially about said central annular rim, said ring including an annular central section of a predetermined diameter and two laterally spaced annular outer sections joined to the central section, with each outer section of said ring having a diameter greater than the predetermined diameter of the central section and defining laterally spaced circumferential surfaces which engage said bushing means so that contact noise between the bushing means and the idler wheel is reduced thereby reducing noise generation as the chain moves about the idler wheel and dampening impact loads applied to the idler wheel mount.

2. The idler wheel according to claim 1 wherein said central rim is provided with an annular recess which accommodates the central section of said ring to prevent lateral shifting of the ring relative to the idler wheel.

3. The idler wheel according to claim 1 further including fastener means for joining opposite ends of said split ring to each other to facilitate assemblage of the idler wheel.

4. A track assembly for a track laying off-highway implement, said track assembly comprising an articulated chain a plurality of pivotally interconnected links, pin and bushing means for pivotally interconnecting adjacent links of said chain together, a rotational wheel about which the chain is entrained, said wheel having axially spaced annular rims of different diameters, and means for reducing noise generated by the chain passing around the wheel, said noise reducing means comprising a substantially continuous elastomeric cushion affixed circumferentially about the larger of the annular rims on the wheel, said elastometric cushion having two laterally spaced annular outer sections joined to each other by a central section, said outer sections having a diameter greater than the diameter of said central section to define two laterally spaced circumferential surfaces which resiliently engage with the bushing means of said articulated chain thereby reducing noise generation caused by chain contact with the wheel.

5. The track assembly according to claim 4 wherein the larger rim on the wheel is configured with an annular recess which receives the central section of the elastomeric cushion arranged circumferentially thereabout thereby inhibiting lateral shifting of the cushion on the annular rim.

6. The track assembly according to claim 5 wherein said cushion has first and second ends and retaining means including an annular clamp which fits about and is recessed from a bushing means engaging surface of said cushion to facilitate assemblage of the cushion onto the wheel.

7. A crawler tractor having a mobile frame supported by an endless track assembly comprised of a plurality of link means articulately coupled together by pin and bushing means, said track assembly being entrained about an idler wheel mounted on the frame to exert a tensioning force against the track assembly, with an outer peripheral surface of said wheel having an annular channel extending thereabout and between opposite side faces thereof to define crown rims on opposite lateral sides of the channel, said track assembly further including noise attenuating means for reducing noise levels caused by said track assembly passing around said wheel, said noise attenuating means comprising an annular elastomeric ring including first and second ends that are releasably fastened about said wheel by ring retaining means including an annular band circumferentially extending within an annular recess defined by the outer periphery of said ring, and wherein at least a widthwise portion of each crown rim acts as a support member for said elastomeric ring which directly and resiliently engages the bushing means thereby reducing contact noise between the wheel and the track assembly as the track assembly rotates around the wheel.

* * * * *